Feb. 10, 1959  H. W. ASHMAN  2,873,008
BUILDING PANEL UNITS AND ROOFS OR WALLS MADE THEREFROM
Filed Jan. 3, 1956

Inventor
HERBERT WILLIAM ASHMAN
By Fetherstonhaugh & Co.
Attorneys

United States Patent Office 2,873,008
Patented Feb. 10, 1959

2,873,008

BUILDING PANEL UNITS AND ROOFS OR WALLS MADE THEREFROM

Herbert William Ashman, West End, Esher, England, assignor, by mesne assignments, to Keasbey & Mattison Company, Ambler, Pa.

Application January 3, 1956, Serial No. 557,158

Claims priority, application Canada August 26, 1955

2 Claims. (Cl. 189—86)

This invention relates to improvements in trough or cavity type structures made from corrugated panel units or sheets of asbestos-cement, metal or suitable material, from which a roof, decking or wall can be constructed.

A particular object of this invention is to provide panel units comprising a corrugated section formed of a plurality of troughs of equal depth and an integral, laterally extending, flat, wing section which is adapted to overlie and to be secured to one side of the corrugated section of an adjacent unit so as to form a trough or cavity structure having a substantially continuous lining surface on one side thereof.

Another object is to provide a relatively inexpensive cavity or trough type decking which is easily and quickly assembled in the field.

A further object is to provide a cavity or trough type decking structure of the character described with a novel arrangement of overlapping joints to reinforce said structure.

Other objects and features characteristic of this invention will be understood more fully from the following detailed description taken in connection with the accompanying drawings, in which—

Figure 1:
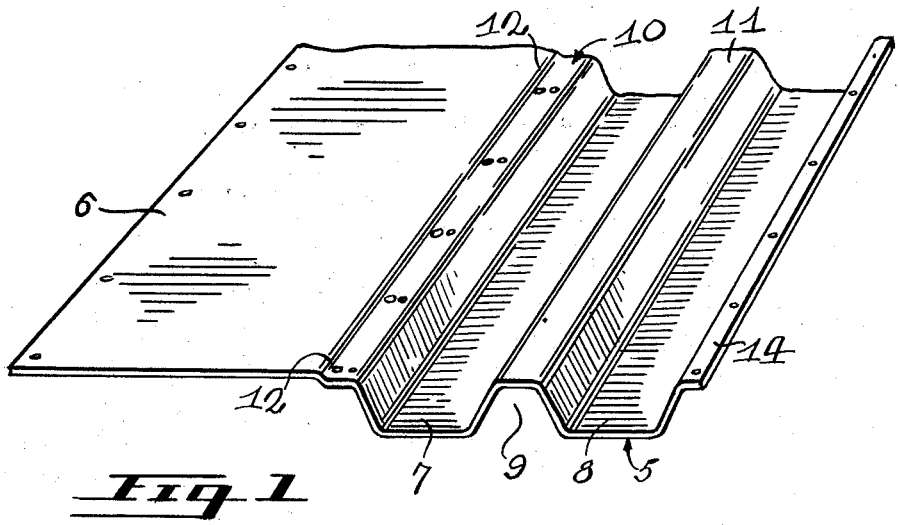
Fig. 1 is a perspective view of a unit embodying my invention.

Referring more particularly to the drawings, Fig. 1 shows a panel unit of substantial length and breadth composed of a corrugated section 5 and a flat wing-like section 6 projecting laterally from one side of said corrugated section 5. The corrugated section is shaped to provide at least two troughs 7 and 8 in one surface of the sheet separated by at least one trough 9 in the opposite surface and intermediate said troughs 7 and 8. The outer side of trough 7 has a flange 10 which extends laterally in the plane of the outer surface 11 of trough 9 and then is stepped upwardly, as indicated at 12, through a distance equal to the thickness of the sheet. The flat wing-like section 6 extends laterally from the stepped marginal portion 12 of flange 10 as an integral part thereof. Section 6 is of a width substantially equal to that of the corrugated section 5 including the flange 10. Trough 8 has an outer marginal flange 14 which extends laterally along a plane slightly lower with reference to the plane of said surface 11 spaced therefrom a distance substantially equal to the thickness of the sheet.

Figure 2:
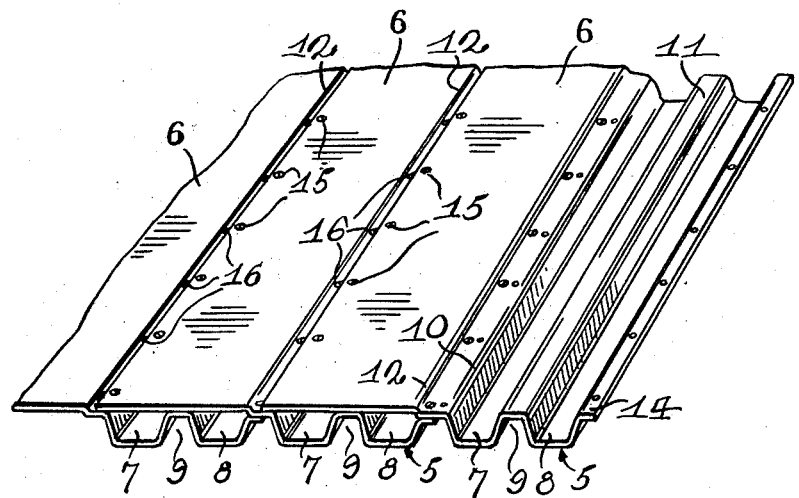
Fig. 2 is a perspective view showing a plurality of units in assembled relation to one another.
Figure 3:
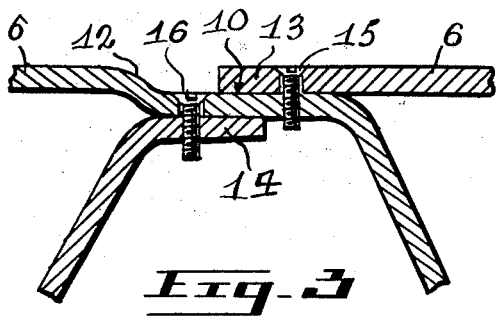
Fig. 3 is a fragmentary view detailing the overlapping joint of three units.

The panel units are assembled as shown in Figs. 2 and 3 by placing the wing-like section 6 of one unit in superimposed relation to the corrugated section 5 of an adjacent unit so that flange 10 of the second unit and flange 14 of the first overlap and the marginal portion 13 of wing section 6 of a third unit flatly engages the upper surface of flange 10 of the second unit. The margin 13 of the third unit is secured to flange 10 of the second unit by screw 15. Screw 16 secures flange 10 of the second unit to flange 14 of the first unit.

Each subsequent unit is similarly connected to provide a panelling or decking structure. An important feature in the assembly of units is particularly illustrated in Fig. 3, in which the marginal portion 13 of a unit at one side of a central unit and the flange 14 of a unit at the opposite side of said central unit are secured to the central unit's flange 10 at opposite surfaces thereof and in overlapping relation to each other to provide a reinforcement to the joint.

The embodiments of the invention in which an exclusive property or privilege is claimed are defined as follows:

1. A building roof or wall structure formed of units of sheet material each comprising a corrugated section and a flat section integrally formed therewith, said corrugated section being formed to provide a plurality of troughs of equal depth including at least two troughs having their open faces on one side of said sheet and another trough intermediate said two troughs and inverted relatively thereto, said flat section extending laterally from one side of said corrugated section along a plane spaced outwardly from and parallel to the upper plane of said corrugated section a distance substantially equal to the thickness of the sheet material and an outwardly directed flange extending from the side of said corrugated section remote from the flat section, each of said units being arranged with their flat sections extending unidirectional and overlying the corrugated section of an adjacent succeeding unit to conjointly form a substantially flat surface on one side of the structure, said units being successively arranged with a substantial surface of the marginal portion of a flat section of a preceding unit and a substantial portion of the flange remote from the flat section of a succeeding unit in flat abutting engagement on opposite sides of a substantial portion of the flange between the trough and the flat section of an intermediate unit, and with marginal portions of said succeeding and preceding units in overlapping relation to one another to provide a reinforced structure joint.

2. A building roof or wall structure as set forth in claim 1, in which said flange remote from the flat section extends along a plane spaced inwardly from and parallel to the upper plane of said corrugated section a distance substantially equal to the thickness of the sheet material.

References Cited in the file of this patent

UNITED STATES PATENTS

| 1,009,230 | Fawkes | Nov. 21, 1911 |
| 1,940,830 | Weyerbacher | Dec. 26, 1933 |
| 2,525,059 | Ashman | Oct. 10, 1950 |

FOREIGN PATENTS

| 773,518 | France | Sept. 3, 1934 |